(12) United States Patent
Wilcox et al.

(10) Patent No.: US 10,615,507 B1
(45) Date of Patent: Apr. 7, 2020

(54) UNMANNED AERIAL VEHICLE (UAV) LANDING MARKER RESPONSIVE TO RADAR SIGNALS

(71) Applicant: Amazon Technologies, Inc., Seattle, WA (US)

(72) Inventors: Scott Michael Wilcox, Kirkland, WA (US); Joshua John Watson, Seattle, WA (US); Scott Raymond Harris, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 356 days.

(21) Appl. No.: 15/635,926

(22) Filed: Jun. 28, 2017

(51) Int. Cl.
*H01Q 15/14* (2006.01)
*H01Q 17/00* (2006.01)
*B64F 1/00* (2006.01)
*B64C 39/02* (2006.01)
*G01S 13/00* (2006.01)

(52) U.S. Cl.
CPC ............ *H01Q 15/148* (2013.01); *B64F 1/00* (2013.01); *H01Q 17/00* (2013.01); *B64C 39/024* (2013.01); *B64C 2201/128* (2013.01)

(58) Field of Classification Search
USPC ...................................................... 244/114 R
See application file for complete search history.

(56) References Cited

U.S. PATENT DOCUMENTS

| | | | | |
|---|---|---|---|---|
| 2,330,096 A * | 9/1943 | Waters | ...................... | B64F 1/18 359/553 |
| 2,502,974 A * | 4/1950 | McElhannon | .......... | G01S 13/76 342/33 |
| 2,520,008 A * | 8/1950 | King | ..................... | G01S 13/756 342/6 |
| 2,667,000 A * | 1/1954 | O'Connor | ................. | B64F 1/20 359/551 |
| 3,725,930 A * | 4/1973 | Caruso, Jr. | ................. | G01S 1/02 342/351 |
| 4,104,634 A * | 8/1978 | Gillard | ..................... | G01S 13/75 342/33 |
| 4,259,658 A * | 3/1981 | Basov | .................. | G05D 1/0684 244/114 R |

(Continued)

OTHER PUBLICATIONS

Office Action for U.S. Appl. No. 15/636,042, dated Aug. 16, 2019, Wilcox, "Unmanned Aerial Vehicle (UAV) Landing Marker Responsive to Radar Signals", 9 pages.

(Continued)

*Primary Examiner* — Bernarr E Gregory
(74) *Attorney, Agent, or Firm* — Lee & Hayes, P.C.

(57) ABSTRACT

An unmanned aerial vehicle (UAV) landing marker that absorbs incoming radar signals emitted by a UAV and/or disperses reflected radar signals. The absorption and/or dispersion of the radar signals creates a reduced radar return in comparison to the environment about the landing marker. The UAV can detect the area of reduced radar return and determine that it is a landing marker. Additionally, the UAV can determine a position of the landing marker relative to the UAV, based on the reduced radar return, to effect delivery of an item by the UAV. The landing marker can include materials, structures and/or features to absorb and/or disperse radar signals to cause the reduced radar return.

20 Claims, 9 Drawing Sheets

Section A-A

(56) References Cited

U.S. PATENT DOCUMENTS

| | | | |
|---|---|---|---|
| 4,733,236 A * | 3/1988 | Matosian | H01Q 15/18 342/169 |
| 4,757,315 A | 7/1988 | Lichtenberg et al. | |
| 5,028,928 A * | 7/1991 | Vidmar | H01Q 17/00 342/10 |
| 5,424,737 A * | 6/1995 | Lindell | H01Q 15/08 342/5 |
| 5,459,468 A * | 10/1995 | Hartal | H01Q 15/18 342/6 |
| 5,670,959 A * | 9/1997 | Nagura | G01S 13/75 342/6 |
| 8,405,539 B2 | 3/2013 | Saitto et al. | |
| 10,249,200 B1 * | 4/2019 | Grenier | B64C 39/024 |
| 10,254,767 B1 * | 4/2019 | Kamon | B64C 39/024 |
| 10,395,544 B1 * | 8/2019 | Harris | G08G 5/02 |
| 2009/0135044 A1 | 5/2009 | Sutphin | |
| 2015/0175276 A1 * | 6/2015 | Koster | B64F 1/32 244/114 R |
| 2015/0183528 A1 * | 7/2015 | Walsh | B64F 1/32 701/3 |
| 2016/0068264 A1 | 3/2016 | Ganesh et al. | |
| 2017/0313439 A1 * | 11/2017 | Holt | B64C 39/024 |
| 2018/0357910 A1 * | 12/2018 | Hobbs | G08G 5/02 |

OTHER PUBLICATIONS

Office action for U.S. Appl. No. 15/636,042, dated Dec. 2, 2019, Wilcox, "Unmanned Aerial Vehicle (UAV) Landing Marker Responsive to Radar Signals", 8 Pages.

\* cited by examiner

Section A-A

Section B-B

US 10,615,507 B1

UNMANNED AERIAL VEHICLE (UAV) LANDING MARKER RESPONSIVE TO RADAR SIGNALS

BACKGROUND

Unmanned aerial vehicles (UAVs) present many benefits in consumer delivery as they are able to quickly deliver items directly to the customer at a desired customer location. Because of this quick and personalized delivery, UAVs are becoming the reality of consumer delivery.

While a UAV may have a location for a delivery, such as an address or coordinates that represent an area of land, it may not know where within the area to deposit the delivery. A landing marker can be placed at a specific location within the area to direct the UAV to the specific location. The UAV can detect the landing marker and home in on the location of the landing marker to make the delivery. To detect the landing marker, a UAV may use one or more onboard systems to detect and identify the landing marker and determine a position of the landing marker relative to the UAV. Typically, landing markers are detected using image sensors. However, image sensors have restrictions and may not be effective in some circumstances, such as at night or low-light situations, in poor weather, and/or at other times.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
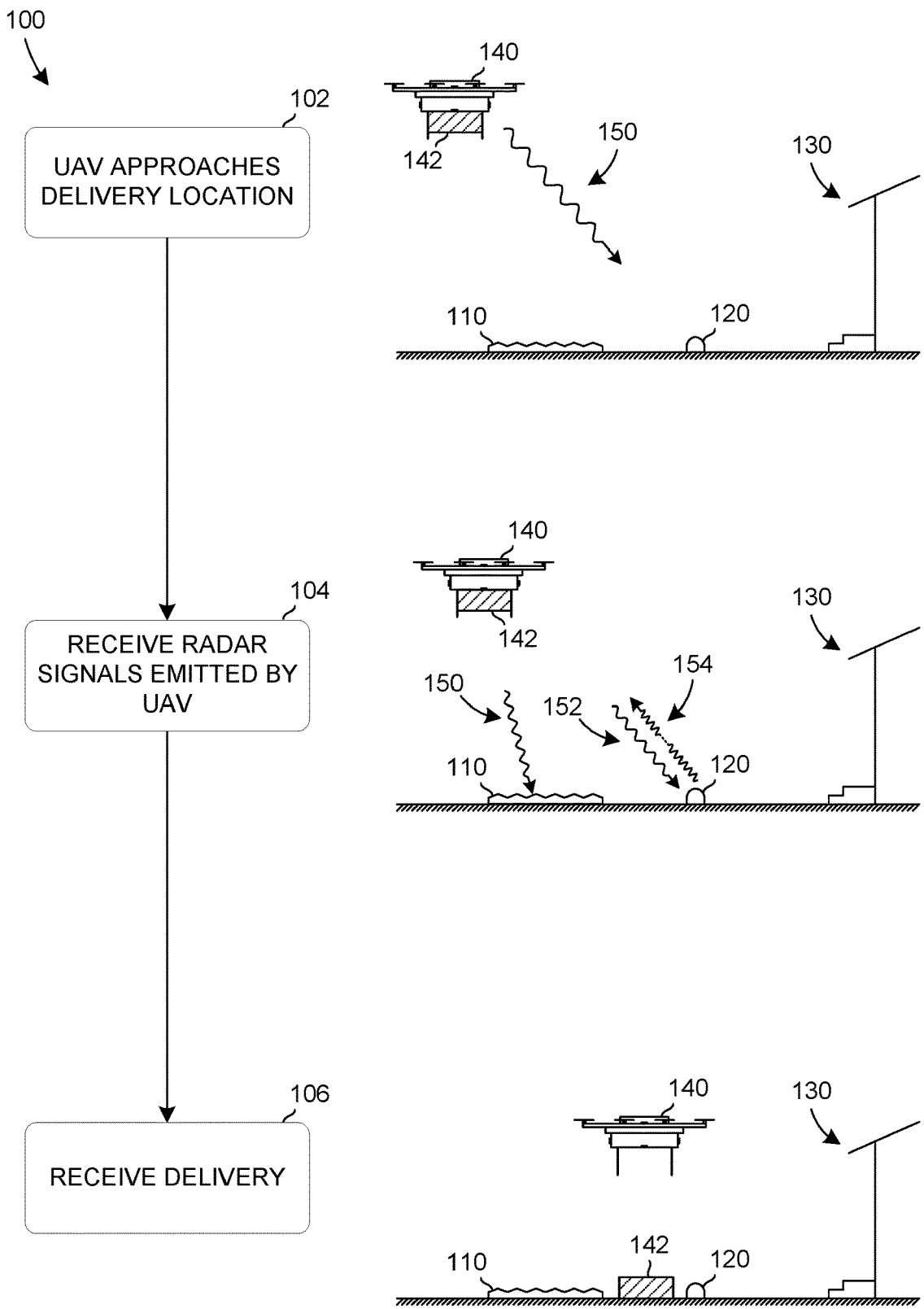
FIG. 1 is a pictorial flow diagram of an illustrative process of a UAV performing a delivery operation, including detecting a landing marker using radar.

This disclosure is related to an unmanned aerial vehicle (UAV) landing marker that can provide information regarding the location of the landing marker to the UAV based on radar signals reflected off of the landing marker. The landing marker can be composed of various materials and/or formed in a variety of shapes or profiles to create a landing marker that absorbs at least some of incoming radar signals and/or disperses or scatters a portion of the radar signals reflected off of the landing marker. A lack of a returning radar reflection from the landing marker can be used by the UAV to determine the location of the landing marker, since the landing marker will appear as a "hole," or area of lesser radar reflection compared to the surrounding environment in a radar "image."

As a UAV approaches a destination that includes the landing marker, the UAV can begin or is already emitting radar signals used to detect the environment surrounding the UAV. Such radar emissions can be used by the UAV to develop a radar "image" of the surrounding environment, allowing the UAV to monitor and avoid obstacles and objects in the environment. The landing marker can be a "passive" landing marker which can absorb these radar signals thereby preventing or reducing the strength of a radar signal from reflecting off of the landing marker. The passive landing marker may not reflect signals, but may instead act as a passive object that can absorb radar signals, preventing reflection of signals. Alternatively, or in conjunction, the passive landing marker can dissipate or disperse the reflected radar signals to limit or prevent reflected signals from being sensed by the UAV. The absorption of the radar signals and/or dissipation/dispersion of the reflected radar signals reduces a radar signature of the passive landing marker, the radar signature being the strength of the radar return, i.e. the reflected radar signals, of the passive landing marker. The reduced radar signature of the passive landing marker can create a void in the radar image, an area of reduced radar return compared to the environment immediately about and adjacent to the passive landing marker. The UAV can detect such a void, or reduced radar return, and determine a position of the passive landing marker relative to the UAV.

In some embodiments, the landing marker may be implemented as an "active" landing marker, that is, a landing marker that transmits a modulated reply or modulated signal (collectively a "modulated response") in response to receiving a radar signal from the UAV. The modulated response transmitted by the active landing marker can assist the UAV in positively identifying the landing marker and with determining the position of the landing marker relative to the UAV. In various embodiments, the modulated response may include additional information, such as an identifier of the landing marker, information about a surrounding environment, indication about motion detection proximate to the landing marker, and/or other pertinent information. An approaching UAV can emit radar signals to sense and/or assess the environment about the UAV. The UAV emitted radar signals can be received by the active landing marker and the marker can broadcast or transmit the modulated response that is detectable by the UAV, such as by the radar system of the UAV. The modulated response can have properties and/or characteristics that can assist the UAV in differentiating the modulated response of the active landing marker from radar signals reflecting off of the environment about the UAV. This differentiation can assist the UAV with isolating and/or processing the modulated response from the active landing marker, allowing the UAV to detect and/or determine a relative position of the landing marker. Additionally, the modulated response can include characteristics and/or properties, such as a pattern or sequences of pulses and/or other signal modulations, to facilitate the transmission of information from the landing marker to the UAV. The UAV can interpret the modulation of the modulated response to receive the information transmitted from the landing marker.

The above described landing markers having a reduced radar return or that transmit a modulated response to a radar signal emitted from the UAV can be detected by the radar system of the UAV, such as the radar system the UAV utilizes to detect and/or assess the operating environment about the UAV. A UAV equipped with such a radar system can detect and/or assess the operating environment about the UAV and the landing marker, without requiring an additional system, such as a visual detection system, to detect or locate the landing marker. The reduction in systems required onboard the UAV reduces the weight required to be carried by the UAV and the infrastructure required to support such systems, such as the power required to operate the systems. This reduction in weigh and complexity of the overall UAV system can allow for increase in the speed, range and other performance aspects of the UAV.

FIG. 1 is a pictorial flow diagram of an illustrative process 100 of a UAV performing a delivery operation, including detecting a landing marker using radar. The process 100 shows an example operation of the UAV detecting, using an onboard radar system, the landing marker.

At 102, a UAV 140 carrying an item 142 (or package) approaches the delivery location 130. As the UAV 140 approaches the delivery location 130, the UAV 140 is emitting radar signals 150 from an onboard radar system, such as a collision avoidance system or a navigation system. The radar signals 150 emitted from the UAV 140 reflect of various surfaces and items within an environment about the UAV 140. The UAV 140 receives the reflected radar signals and can interpret the reflected signals to detect and assess the environment about the UAV 140. A landing marker, such as a passive landing marker 110 and/or an active landing marker 120, can be placed at the delivery location 130 to mark a location for the UAV 140 to deposit the item 142.

At 104, the radar signals 150 emitted from the UAV 140 are received by the landing marker 110, 120 and the reflection, or lack thereof, of the radar signals 150 off of the landing marker 110, 120, or a modulated response from the landing marker 110, 120, can be detected or received by the UAV and used to determine position of the landing marker 110, 120 relative to the UAV, and possibly other information as discussed herein.

Radar signals 150 striking the passive landing marker 110 are absorbed or dispersed as weaker reflected radar signals and/or reflected radar signals that are directed away from the original source, i.e. the UAV 140. The absorption of the radar signals 150 and/or the reduced reflected radar signals, cause the radar return, the radar signals reflected off of the passive landing marker 110 and received by the radar system of the UAV, to be smaller or lesser than the radar return from the surrounding environment about the UAV 140 and the passive landing marker 110. The UAV, or systems thereof, can detect and/or interpret the reduced radar return of the passive landing marker 110 to detect the landing marker and/or determine a position of the passive landing marker 110 relative to the UAV 140.

Radar signals 152 striking the active landing marker 120 cause the active landing marker 120 to transmit a modulated response 154. The modulated response 154 can be detected by one or more systems of the UAV 140, such as the radar system that emits the radar signals 150. The UAV can detect and/or assess the modulated response 154 to detect the active landing marker 120 and/or determine a position of the active landing marker 120 relative to the UAV 140. The modulated response 154 can have different properties and/or characteristics than radar signals reflecting off of the environment about the UAV and the active landing marker 120, allowing the modulated response 154 to be more easily differentiated from the rest of the radar signals received by the UAV 140. Additionally, the modulated response 154 can serve as a data transfer between the active landing marker 120 and the UAV 140, allowing the active landing marker 120 to transmit information, such as a location of the landing marker 120, an identification of the landing marker 120, a status of a deposit area near or about the landing marker 120, and other information, to the UAV 140.

At 106, the UAV 140, having detected the landing marker 110, 120, deposits the item 142, relative to the landing marker 110, 120. Additionally, the UAV 140 can transmit an indication that the delivery of the item 142 has been successfully made. Alternatively, the landing marker 110, 120 can include a communication component to transmit a similar notification, such as to a user expecting the delivery, that delivery of the item 142 is complete. In practice, the environment may only have one of the landing markers 110, 120. However, both landing markers are shown in FIG. 1 for discussion purposes. Additional details about these landing markers is provided with reference to the following figures.

Figure 2A:
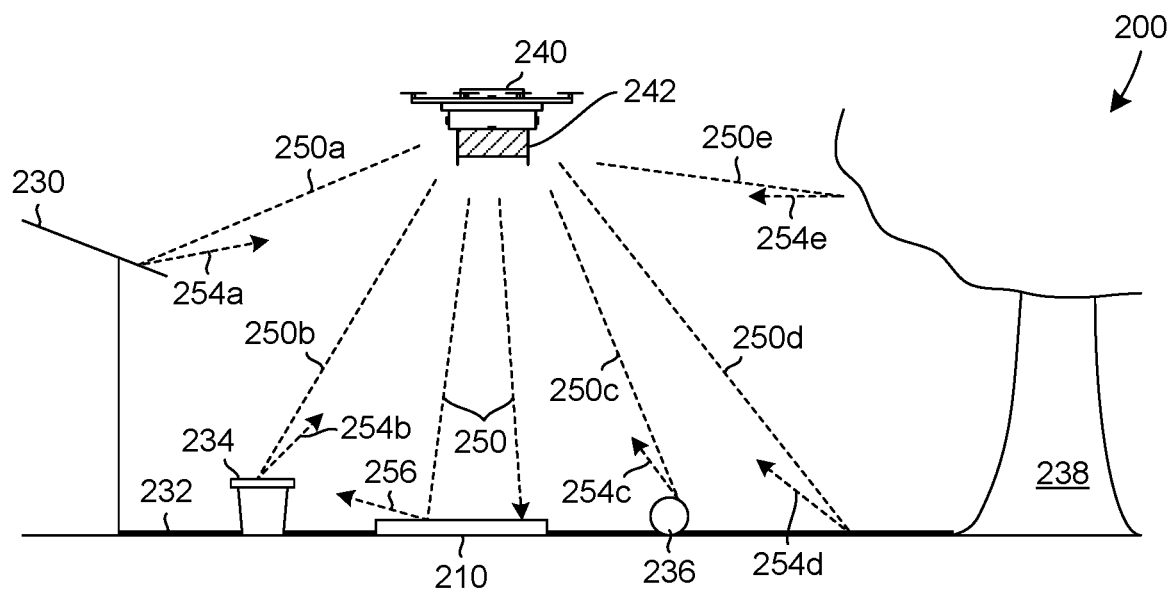
FIG. 2A is schematic diagraph showing a side elevation view of a UAV radar system detecting a delivery environment.

FIG. 2A is illustrative of a UAV 240 using a radar system to detect a delivery environment 200. The UAV 240 emits radar signals, such as 250a-250e, that contact and reflect off of various objects and/or surfaces within the environment 200 about the UAV 240. The UAV 240 receives the reflected radar signals, such as 254a-254e, and detects and/or assesses the surrounding environment 200 based on the reflected radar signals. The reflected radar signals, such as 254a-254e, can be processed by the UAV 240 radar system for collision avoidance with objects and/or surface within the environment 200 about the UAV 240.

The UAV 240 emits radar signals 250a-250e that reflect off of the various objects and surfaces within the environment 200 about the UAV. The radar signals 250a-250e can be emitted individually, such as by a scanning radar that emits a beam of radar signals that is scanned across an area of the environment 200 about the UAV or can be a wave signal the emanates from a central point, the UAV 240. In either case, the radar signals emitted from the UAV 240 contact the objects and surfaces of the environment 200 and reflected radar signals are detected by the UAV 240. For example, a radar signal 250a, emitted from the UAV 240, can contact a surface or portion of a house or delivery location 230, and a reflected radar signal 254a, or portion thereof, can be directed towards and/or received at the UAV 240. Based on the reflected radar signal 254a, the UAV 240 can determine various information regarding the delivery location 230, such as a position of the delivery location 230 relative to the UAV 240. Positional and/or other various information regarding the delivery location 230, as determined by the UAV 240 based on the reflected radar signal 254a, can be used by the UAV 240 for various UAV operations, such as collision avoidance to prevent an interaction between the UAV 240 and delivery location 230. The orientation and/or composition of the surface or object can affect the strength and/or direction of the reflected radar signals, such as 254a-254e. The UAV 240, or system thereof, can optionally interpret the reflected radar signals to determine various information regarding the surface or object from which the radar signals were reflected, such information can include a surface/object type, surface/object identification and other information that can be used by the UAV 240 for one or more UAV operations.

Other objects within the environment 200 can include objects found in a residential or other setting, such as the ground 232, a flower pot 234, a ball 236, a tree 238, and other objects, both natural and man-made, that could be found in or near a delivery location 230. Each of the objects can reflect a portion of the incoming radar signals 250a-250e and the UAV 240, or systems thereon, can receive the reflected radar signals to determine information about the various objects, 232, 234, 236, 238, including a relative position of the object. The various reflected radar signals 254b-254e can have similar and/or unique properties or characteristics that can be indicative of the object or properties of the object.

A passive landing marker 210, that absorbs incoming radar signals 250 and/or disperses reflected radar signals 256, is located in the environment 200 and can denote or assist the UAV 240 in depositing a delivery 242 at a location within the environment 200. The passive landing marker 210 absorbs incoming radar signals 250 and/or disperses reflected radar signals 256, creating an area of reduced or no radar reflection that can be detected by the UAV 240. The UAV 240 can detect the lack of or reduction in the reflected radar signals due to the passive landing marker 210 and determine a position of the passive landing marker 210 relative to the UAV 240.

Figure 2B:
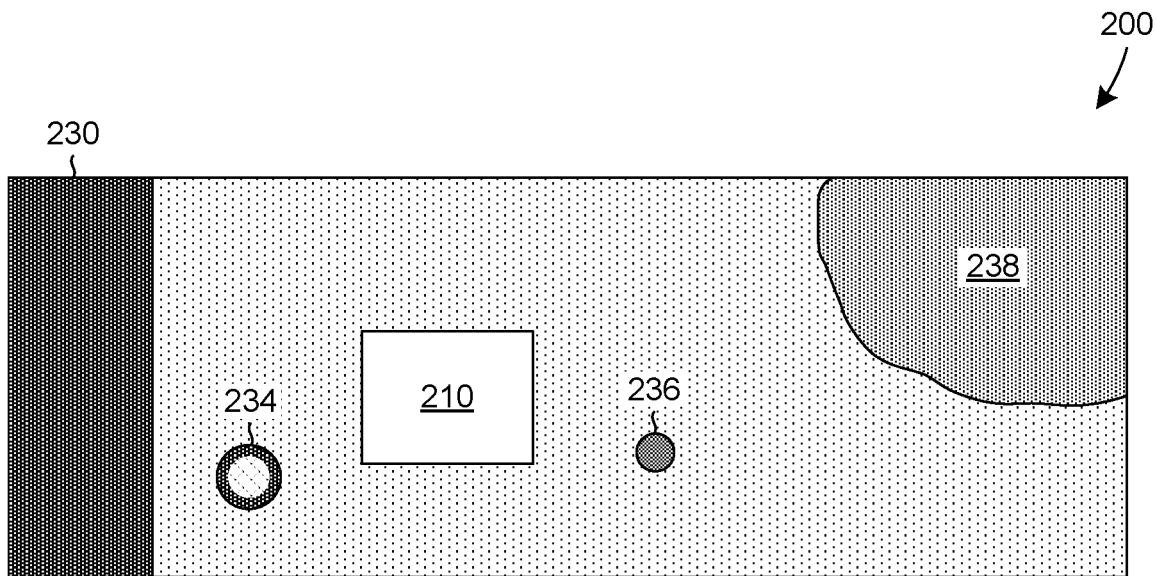
FIG. 2B is schematic diagram showing a top plan view of the delivery environment of FIG. 2A, as detected by the UAV radar system.

FIG. 2B illustrates the delivery environment 200 of FIG. 2A, as detected by the UAV 240 radar system. The reflected radar signals are shown as a density plot indicative of the strength and/or quantity of the reflected radar signals received by the UAV 240. The objects of FIG. 2, such as the delivery location 230, flower pot 234, ball 236, and tree 238 are shown as reflecting stronger/more radar signals, as indicated by the increased density of the point cloud of FIG. 2B corresponding to the location of the objects within the environment 200. The ground 232 has a reduced radar return, i.e. weaker/less reflected radar signals, since the ground absorbs a portion of the radar signals 250 and/or disperses a portion of the reflected radar signals 254b. The passive landing marker 210 has little or no reflection and reflected radar signals 256 are dispersed, causing a "hole" or empty space in the density plot of the environment 200. The UAV 240 can detect or determine this lack or reduction in reflected radar signals 256 associated with the passive landing marker 210 to determine a position of the landing marker 210 relative to the UAV 240. The UAV 240 can use this relative position to determine a proper location to deposit the delivery 242.

Figure 3A:
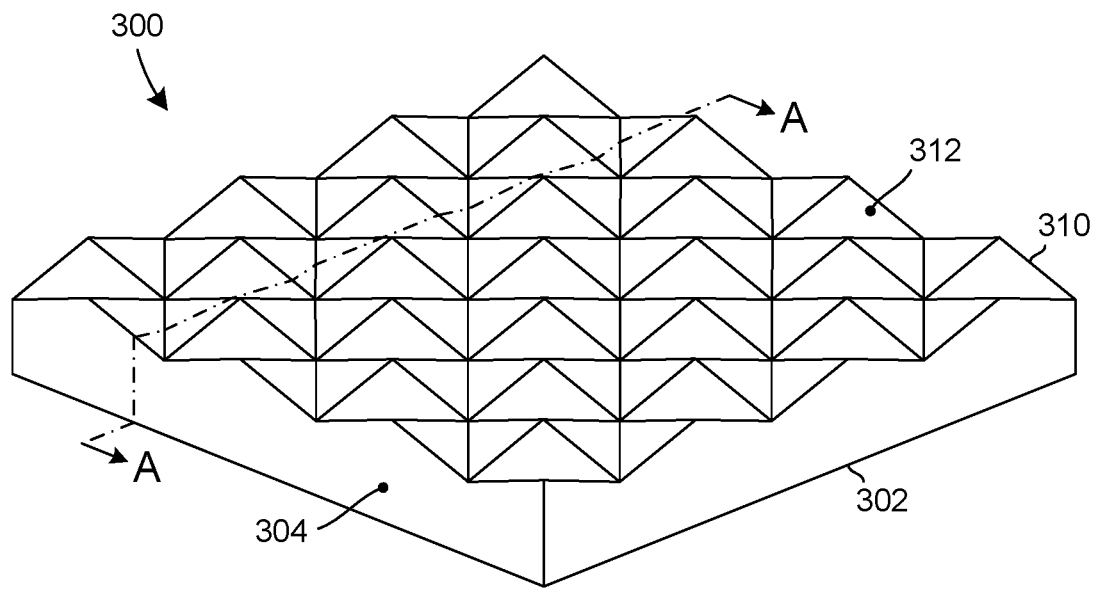
FIG. 3A is a perspective view of an example landing marker having facets.

FIG. 3A is a perspective view of an example passive landing marker 300 that includes facets 312. The passive landing marker 300 is shown as substantially square in FIG. 3A, however, the properties and/or characteristics of the passive landing marker 300 can be adapted or incorporated into a variety of shapes and forms to create a passive landing marker that absorbs incoming radar signals and/or disperses reflected radar signals. The passive landing marker 300 includes a base 302, sides 304 and a top 310, which can have a profile to assist with absorption of incoming radar signals and/or disbursement of radar signals reflected off of the top 310 of the passive landing marker 300. The top 310 of the passive landing marker 300 can include multiple facets 312, or angular surfaces, that can reflect incoming radar signals away from their origin, a UAV emitting the radar signals, in multiple directions, and/or reduce the energy of the reflected wave. The facets can be sized, shaped, angled and/or include other characteristics to minimize and/or disperse radar signals reflected therefrom. These and other various properties of the passive landing marker 300 can be selected or based on the frequency or other characteristics of the expected incoming radar signals.

Figure 3B:
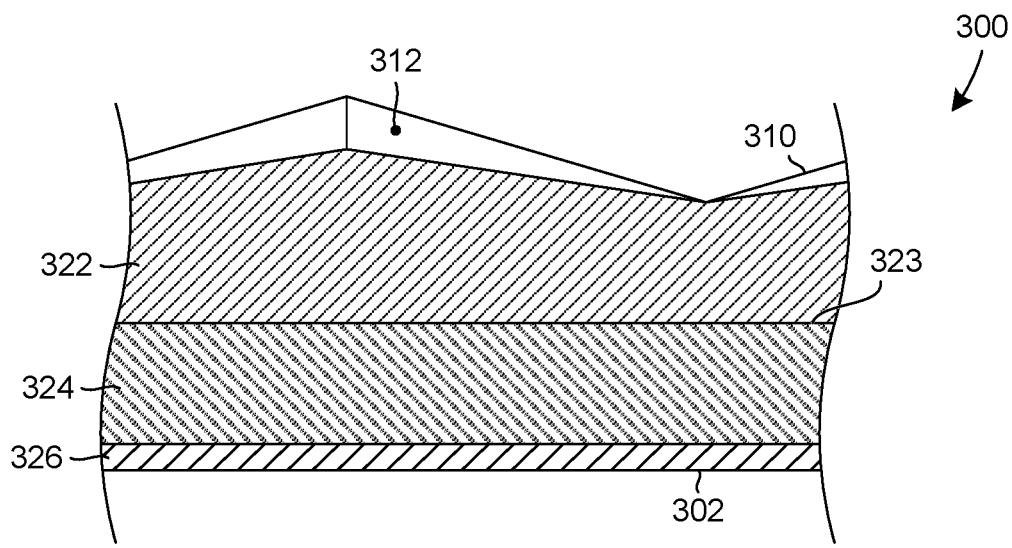
FIG. 3B is a cross-sectional side elevation view of the example landing marker of FIG. 3A.

FIG. 3B is a cross-sectional view of the example passive landing marker 300 of FIG. 3A. The passive landing marker 300 can include multiple materials, as shown in FIG. 3B, or be constructed of a single material. The selected material(s) can be based on properties or characteristics of the expected incoming radar signals and to assist with absorption of the incoming radar signals and/or dispersing the reflected radar signals. The materials used to construct the passive landing marker 300 can be rigid, semi-flexible, or flexible, allowing for the passive landing marker 300 to be stored and deployed in a variety of manners and methods, such as rolling the passive landing marker 300 or inflating the passive landing marker 300. The materials can also be selected such that the passive landing marker 300 maintains or assumes a desired or proper form or shape when deployed and/or is suitable for use in the environment in which the passive landing marker is to be placed, such as the environment 200 of FIGS. 2A and 2B. Additionally, the size and/or dimensions of the passive landing marker 300 can be based on properties and/or characteristics of the expected incoming radar signals and/or radar system of a UAV, such as a resolution of the radar. The passive landing marker 300 can be suitably sized so that the reduction in or lack of reflected radar signals due to the passive landing marker 300 can be detected and/or recognized by the UAV and/or its radar system.

The example passive landing marker 300, as shown in FIGS. 3A-3B, includes a first material 322 that forms the top 310 of the passive landing marker 300. The first material 322 has a first density and can be profiled to form the facets 312. The first material 300 can be selected based on properties and/or characteristics of the expected incoming radar signals, such that the first material 300 has properties, such as the first density, that assist with the absorption of the incoming radar signals and/or disbursement of reflected radar signals. The passive landing marker 300 can also include a second material 324 having a second density and/or other second properties and/or characteristics. The combination of the first material 322, having first properties and characteristics, and the second material 324, having second properties and characteristics, can be selected to absorb the expected incoming radar signals and/or disperse radar signals reflected from the passive landing marker 300.

The passive landing marker 300 can have a density gradient, such as shown in FIG. 3B in which the passive landing marker 300 includes multiple materials, to assist with the absorption of incoming radar signals and/or disbursement of reflected radar signals. The density gradient can be selected and/or designed to absorb and/or disperse radar signals having certain properties and/or characteristics, such as the expected incoming radar signals that would be emitted by a UAV. While the passive landing marker 300, as shown in FIG. 3B, is composed of multiple materials, a single material having a desired or necessary density gradient can be used to construct the passive landing marker 300.

The interface 323 between the one or more materials, such as the first material 322 and second material 324, of the passive landing marker 300 can also have a profile. A profiled interface 323 can assist with the absorption of incoming radar signals and/or disbursement of reflected radar signals. The interface 323 can also assist by reflecting the incoming radar signal internally within the passive landing marker 300. The internal reflection of a radar signal within the passive landing marker 300 can diminish the energy of a reflected signal that is radiated from the passive landing marker 300 after being so internally reflected and/or assist with the absorption of the incoming radar signal by one or more materials and/or structures of the passive landing marker 300.

Additionally, one or more of the materials comprising the passive landing marker 300 can be selected to provide structure, usability, durability and/or other use properties of the passive landing marker 300. The other material(s) of the passive landing marker 300 can be selected based on their properties and characteristics in relation to the expected incoming radar signals and their ability to absorb and/or disperse reflected radar signals.

The passive landing marker 300 can include a backing material 326, which can form the base of the passive landing marker 300. The backing material 326 can be selected to protect the passive landing marker 300 from being damaged by a surface upon which the passive landing marker 300 rests, properly aligning and/or orienting the passive landing marker 300 when in use, and/or other considerations or requirements of the passive landing marker 300. The backing material 326 can also be selected based on an ability to absorb incoming radar signals, such as those emitted by an approaching UAV, and/or an ability to disperse reflected radar signals.

Figure 4:
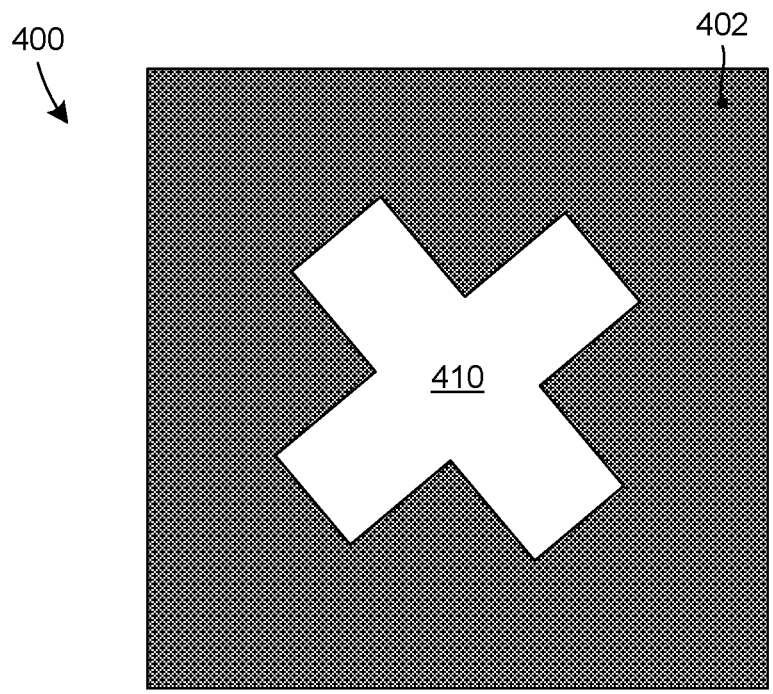
FIG. 4 is a top view of an example landing marker that includes a radar reflective portion thereon.

FIG. 4 is a top view of an example passive landing marker 400 that includes a radar reflective portion 410 disposed on an upper surface 402 of the passive landing marker 400. The upper surface 402 of the passive landing marker 400 is constructed to absorb incoming radar signals and/or disperse reflected radar signals, thereby creating an area of reduced radar return as received by the UAV radar system. The radar reflective portion 410, in contrast, is constructed to purposefully reflect the incoming radar signals. The reflective nature of the radar reflective portion 410 can assist the UAV in locating the passive landing marker 400 and/or identifying the passive landing marker 400. Additionally, placing the radar reflective portion 410 on the upper surface 402, having a reduced radar return, can allow the radar reflective portion 410 to stand out and be more easily/accurately detected by the UAV radar system.

The reflective portion 410 can be constructed from a radar reflective material, such as a metal. The reflective portion 410 can be sized such that is it detectable by a UAV radar system having a known resolution. Additionally, the radar reflective portion 410 can be constructed to act as a retroreflector to reflect the incoming radar signals back to their source, i.e. the UAV emitting the radar signals. The retroreflection of the radar signals can assist the UAV in detecting the reflected radar signals and assist the UAV in discerning properties and/or characteristics of the radar reflective portion 410.

As shown in FIG. 4, the radar reflective portion 410 can be formed into a shape, such as the "X" shown, to provide a target or other information, such as a unique identification, that can be detected by the UAV. For identification of the passive landing marker 400, the UAV radar system can determine the shape of the radar reflective portion 410 based on the reflected radar signals from the passive landing marker 400 and the determined shape can be correlated, using a database or other source of information, to one or more properties and/or characteristics of the passive landing marker 400. The ability to identify a property and/or characteristic of the passive landing marker 400 can assist the UAV in the depositing a delivery at the correct location.

Figure 5A:
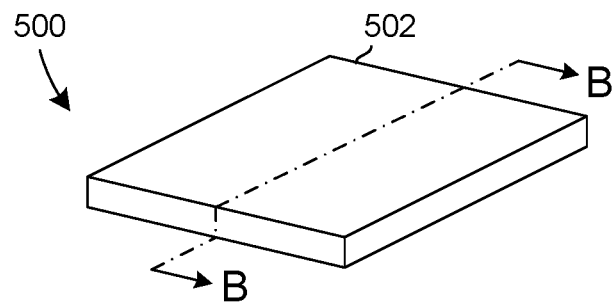
FIG. 5A is a perspective view of an example radar absorbent landing marker.

FIG. 5A is a perspective view of an example radar absorbent landing marker 500. The passive landing marker 500 is an enclosed structure containing radar absorbent structures and/or materials that absorb incoming radar signals emitted from a UAV and prevent their reflection back towards the UAV. The passive landing marker 500 can be constructed in a variety of shapes and/or forms, such as the cube shown in FIG. 5A. The shape and/or form of the passive landing marker 500 can assist with identification of the passive landing marker 500 by the UAV and/or can convey information to the UAV, such as a delivery target.

Figure 5B:
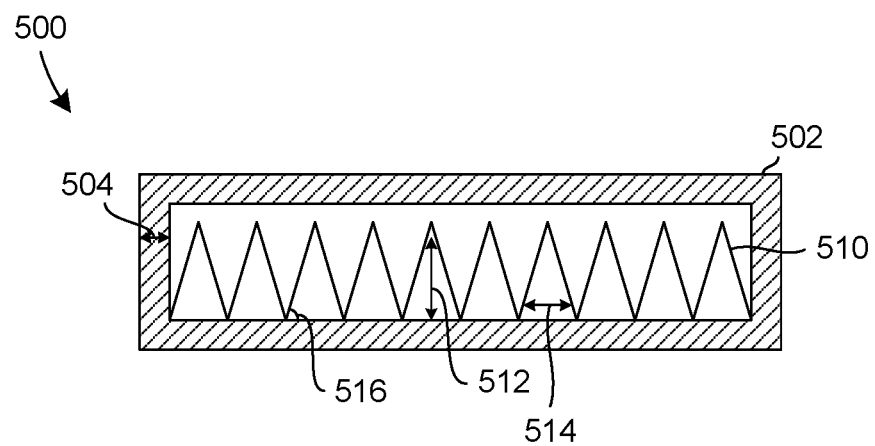
FIG. 5B is a cross-sectional view of the example radar absorbent landing marker of FIG. 5A.

FIG. 5B is a cross-sectional view of the example radar absorbent, passive landing marker 500 of FIG. 5A and shows example radar absorbent structures. The example radar absorbent structures that can be contained within the passive landing marker 500, can include pyramidal cone structures 510, as shown in FIG. 5B. The radar absorbent structures, such as the pyramidal cone structures 510, can be oriented and/or arranged to absorb the incoming radar signals, such as being oriented towards the source of the incoming radar signals. The pyramidal cone structures 510 can be constructed of a radar absorbent material and structured to absorb incoming radar signals and preventing their reflection. The pyramidal cone structures can have a height 512, a width 514, and an angle 516 that assist with absorbing a wavelength and/or a range of wavelengths of an incoming radar signals, as can be emitted from an approaching UAV. The various properties and/or characteristics of the pyramidal cone structures 510, such as the material, the height 512, the width 514, and the angle 516, can be selected based on properties and/or characteristics of the expected incoming radar signals, such as an energy, wavelength, frequency, and/or other properties/characteristics.

The enclosure 502, containing the radar absorbent structures and/or materials, can be constructed of a material that is "transparent" to radar signals, i.e. a material that allows the radar signals to pass through with minimal reflection; such materials can include plastics, wood and other materials. The enclosure 502 can also be constructed having multiple openings, thereby reducing the enclosure 502 structure off of which incoming radar signals can be reflected. Additionally, a thickness 504 of the enclosure walls can be selected to assist with minimizing the reflection of incoming radar signals off of the enclosure 502 structure. The enclosure 502 can also be constructed with consideration to the environment in which the passive landing marker 500 will be placed, such that the passive landing marker 500 is durable and that the radar absorbent properties of the passive landing marker 500 are not unduly influenced by the surrounding environment.

Dimensions and the shape of the enclosure 502 can also be based on the properties and/or characteristics of the radar absorbent material within, such as the pyramidal cone structures 510. Additionally, the dimensions and shape of the enclosure can be based on the resolution of the incoming radar signals, to allow the passive radar landing marker 500 to be detected by the radar system of the UAV. Additionally, the shape of the enclosure 502 can be used as an identification means, allowing the UAV to detect and/or determine the shape of the passive landing marker 500 for identification purposes.

Figure 6:
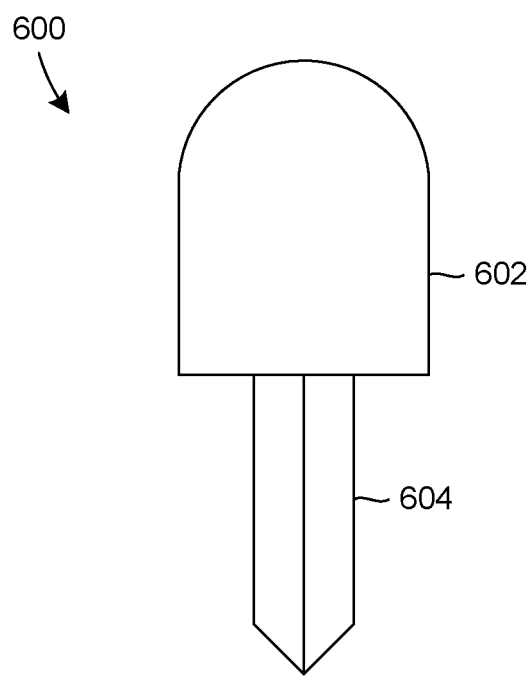
FIG. 6 is a side elevation view of an example landing marker including a transponder.

FIG. 6 illustrates an example active landing marker 600. The active landing marker 600 includes a transponder or transmitter that transmits a reply, or modulated response, upon receiving an incoming radar signal, such as a radar signal emitted from a UAV for navigation, or other, purposes. The active landing marker 600 includes an upper portion 602 that is located above ground and contains all or a portion of the electronic components of the active landing marker 600, such as an antenna and transmitter. A lower portion 604 of the active landing marker 600 can serve as an anchor that can be placed in the ground to securely anchor the active landing marker 600 in a location. Alternatively, the active landing marker 600 can consist of only the upper portion 602 which is placed on a surface, such as the ground, to designate a delivery location for the UAV to deposit a delivery at. The active landing marker 600 can be constructed in a variety of shapes and/or forms, which can be based on a variety of factors and/or considerations, such as the environment in which the active landing marker 600 is to be placed, packaging of the components of the active landing marker 600, and/or other considerations.

Figure 7:
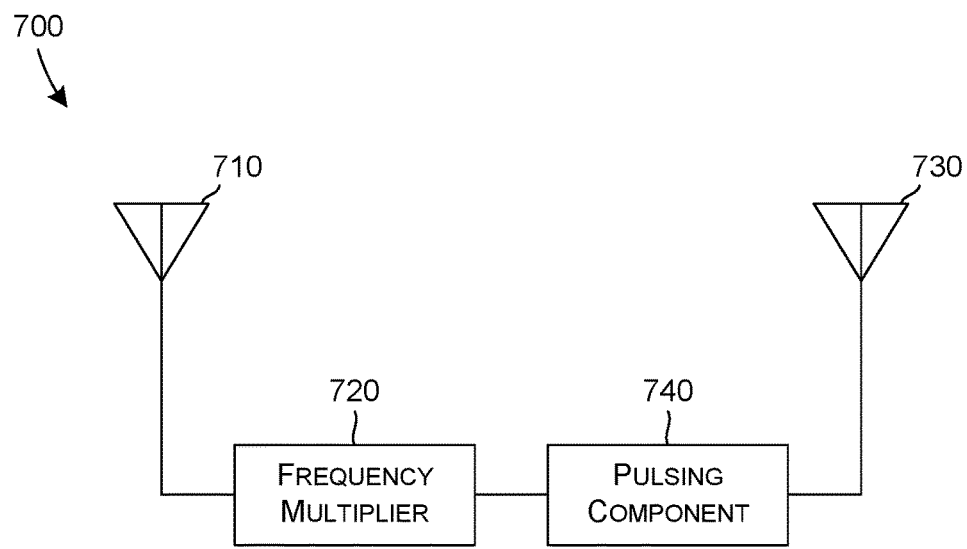
FIG. 7 is an example circuit diagram of a transponder of a landing marker.

FIG. 7 is an example circuit diagram of a transponder 700, as can be used in an active landing marker, such as 600 of FIG. 6. The transponder 700 receives an incoming radar signal and automatically transmits a modulated response in reply. The transponder 700 does not require a power source in order to transmit the modulated response, instead, energy of the received radar signal is used to power the transmission of the modulated response. In the example transponder 700 of FIG. 7, the radar signal, such as emitted by an approaching UAV, is received by an antenna 710 and a frequency multiplier 720 scales the frequency of the received signal. The scaled signal is then transmitted as a modulated response through a broadcast antenna 730, and the UAV can receive the modulated response to determine the presence and/or a location of the active landing marker relative to the UAV. The UAV can analyze the modulated response received from the active landing marker, such as over a period of time, to determine a changing strength of the modulated response, which can be used to determine a distance of the active landing marker from the UAV based on the Doppler effect. Additionally, the UAV can analyze the directionality of the incoming modulated response to determine a direction the landing marker is located in relative to the UAV.

The antenna 710 can be attuned to receive the radar signals emitted from the UAV. That is, the antenna 710 can be constructed and/or structured to receive radar signals having one or more properties and/or characteristics of the incoming radar signal emitted by a radar system of the UAV. Properties and/or characteristics of the incoming radar signal can include the wavelength of the incoming radar signal, the frequency of the incoming radar signal, and/or other properties and/or characteristics of the signal. The form and/or materials of the antenna 710 can be selected based on these properties and/or characteristics such that the antenna 710 is inherently attuned to receive incoming radar signals, such as those emitted by the UAV.

The radar signals emitted from the UAV have various properties and/or characteristics, including a fundamental frequency. The fundamental frequency of the radar signals is the lowest frequency of the periodic waveform of the radar signal(s). The modulated response transmitted by the transponder 700 is a harmonic, or multiple, of the fundamental frequency of the UAV emitted radar signals. Transmitting a modulated response or reply that is a harmonic of the incoming radar signal can allow the UAV radar system to more easily discern and/or detect the reply signal while receiving the reflected radar signals that are reflected off of various surfaces and objects in an environment about the UAV.

To generate the modulated response, which is a harmonic of the fundamental frequency of the incoming radar signals, the transponder 700 includes the frequency multiplier 720. The frequency multiplier 720 multiplies the harmonic frequency, such as $2x$ the fundamental frequency of the incoming radar signal, to generate a second harmonic as the modulated response. To generate the harmonic, the frequency multiplier 720 can include one or more non-linear elements, such as a Schottky diode, varactor and/or other non-linear elements, that can multiply the fundamental frequency of the received signal to generate the harmonic reply or modulated response. The selection and/or arrangement of the non-linear element(s) is such to minimize and/or reduce the loss of power of the signal during the multiplication process.

The broadcast antenna 730 then broadcasts the multiplied, harmonic modulated response from the transponder 700. The modulated response can be received and/or detected by the UAV to signal the presence of a landing marker associated with the transponder 700 and/or used for locating a position of the transponder 700 relative to the UAV. As with the antenna 710, the broadcast antenna 730 can be constructed/structured to be attuned to transmit the modulated response, through one or more of the shape, form, materials, and/or other considerations of the broadcast antenna 730.

Additionally, the transponder 700 can include an optional pulsing component 740. The pulsing component 740 can pulse or otherwise modulated the frequency multiplied signal from the frequency multiplier 720 in order to transmit additional information to the UAV. The UAV can receive and interpret the pulsing and/or modulation of the modulated response to determine the additional information transmitted by the transponder 700. For example, the pulsing component 740 can pulse the modulated response in a predetermined fashion, such as a set number of pulses. The UAV can receive the pulsed modulated response and can correlate the number of pulses received with a condition or other information. The correlation of the pulsed modulated response and information can be contained within a database accessible by one or more systems of the UAV. The UAV can then execute actions or perform other functions based on the determined condition or information that was associated with the pulsed nature of the modulated response as received by the UAV.

The frequency multiplier 720 and pulsing component 740 can individually, or together, modify or modulate the modulated response that will be transmitted by the broadcast antenna 730. That is, the modulated response can be a harmonic of the fundamental frequency of the incoming signal, a pulsed signal, or both. The use of a harmonic modulated response in conjunction with pulsing the modulated response can allow for easier detection of the modulated response by the UAV and also facilitate communication between the landing marker associated with the transponder 700 and the UAV.

Figure 8:
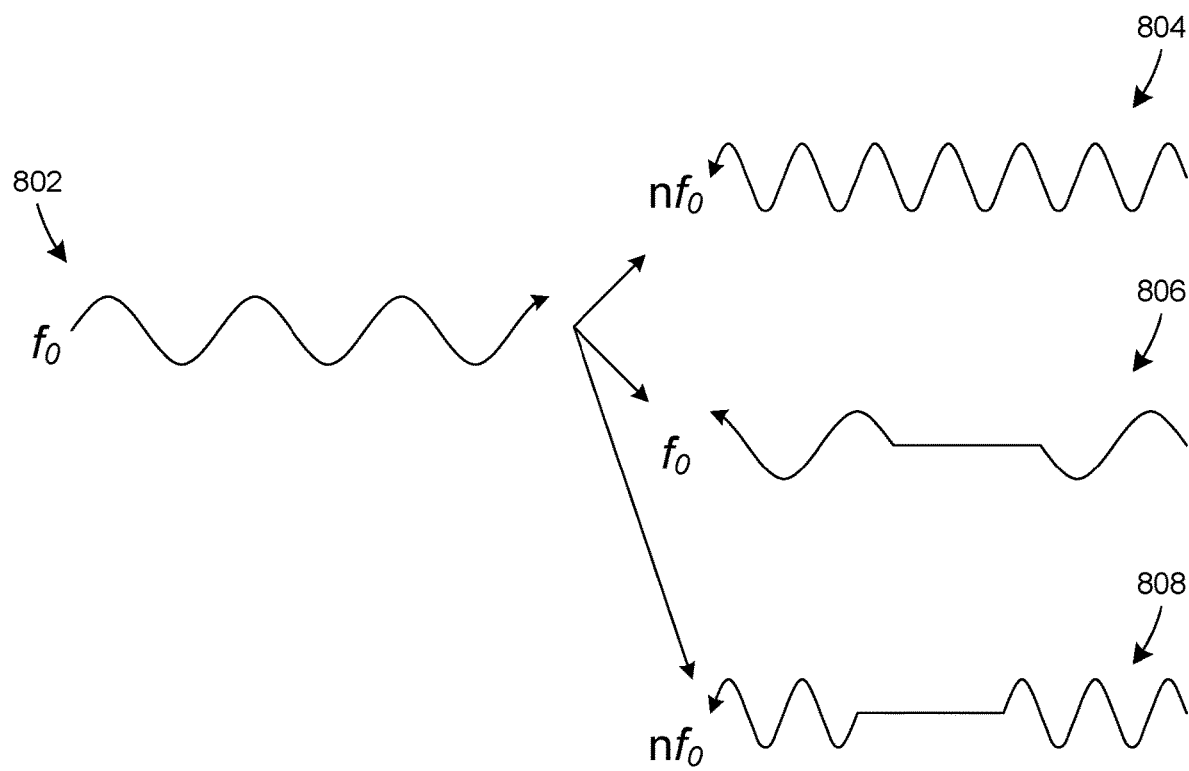
FIG. 8 illustrates an example signal received by the transponder of FIG. 7 and an example modulated response transmitted by the transponder of FIG. 7.

FIG. 8 illustrates an example incoming radar signal 802 having a fundamental frequency, such as might be received by the transponder 700 of FIG. 7, and example harmonic modulated responses, 804, 806 and 808, transmitted by the transponder 700 of FIG. 7. The incoming radar signal 802 has a fundamental frequency, as discussed above with regards to the transponder 700 of FIG. 7. The modulated response 804 transmitted in response to the received incoming radar signal 802, is a harmonic, a multiple, of the fundamental frequency of the incoming radar signal 802. The modulated response 804 can be any order of a harmonic of the fundamental frequency, such as a first, second, third . . . $n^{th}$, order harmonic. The use of a harmonic as the modulated response 804 can assist the receiving radar system in interpreting the modulated response 804 as a distinct signal rather than a reflected return or noise. In the example shown in FIG. 8, and as used in the example transponder 700 of FIG. 7, the modulated response 804 is a second order harmonic, that is, the modulated response 804 has a frequency equal to twice the fundamental frequency of the incoming radar signal 802. Modulated response 806 is pulsed, or discontinuous, as shown due to the pulsing component 740 of the transponder 700 pulsing or cycling the signal 806 transmitted in response to the incoming radar signal 802. The pulsed nature of the modulated response 806 can be used to transmit information between the transponder 700 and a UAV emitting the incoming radar signal 802. Modulated response 808 is both pulsed and a second order harmonic of the fundamental frequency of the incoming radar signal 802. The modulated response 808 can be used, similar to the modulated response 806, to facilitate communication with the UAV by pulsing the modulated response 808. Additionally, the second order harmonic frequency of the modulated response 808 can assist the UAV in distinguishing the modulated response 808 from other reflected radar signals returning to the UAV.

Figure 9:
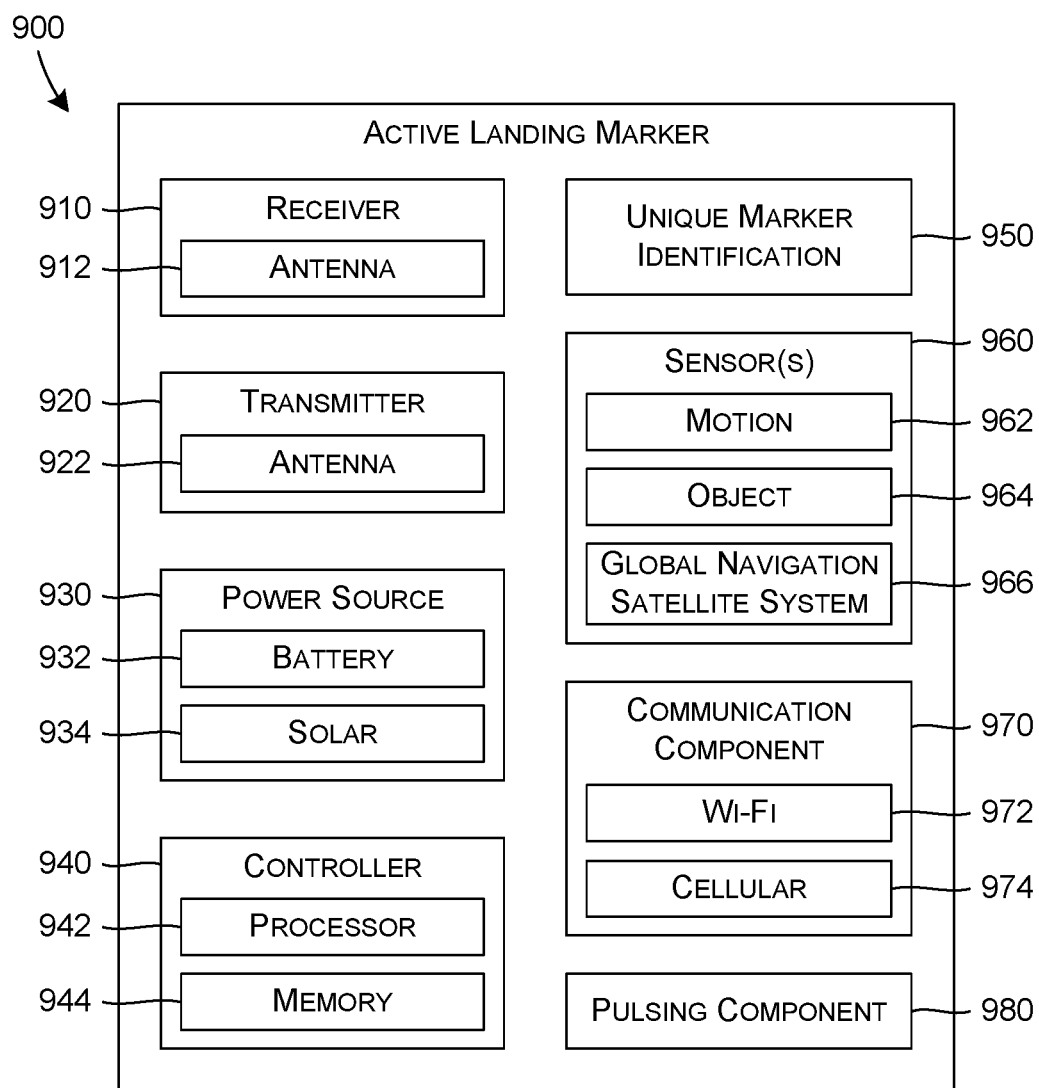
FIG. 9 is a block diagram of an example active landing marker.

FIG. 9 illustrates a block diagram of an example active landing marker 900. The active landing marker 900 includes a receiver 910, a transmitter 920, a power source 930, and/or, optionally, a controller 940, an identification 950, a sensor(s) 960, and a communication component 970. The active landing marker 900 transmits a reply signal in response to receiving an incoming radar signal, such as a radar signal emitted from a UAV. However, the reply signal transmitted by the active landing marker 900 can be a simple reply signal receivable by the UAV and/or can contain additional information such as information regarding an environment about the active landing marker 900, the unique identification 950 of the active landing marker 900 and/or other information and/or communications between the landing marker 900 and the UAV. In order to transmit the reply signal and/or additional information, the active landing marker 900 includes the power source 930 to power transmission of the reply signal via the transmitter 920. The ability of the active landing marker 900 to transmit additional information to the UAV can allow the active landing marker 900 to assist the UAV in the delivery process.

The receiver 910 can include an antenna 912, that can be constructed and/or structured to receive an expected incoming radar signal from the UAV. That is, the antenna 912 can be constructed and/or structured to receive signals having known properties and/or characteristics, such as the incoming radar signals emitted by the UAV. The antenna 912 can be made of materials and/or have a form capable of receiving the radar signals emitted by the UAV. Additionally, the antenna 912 can be constructed and/or structured to receive a range of signals that includes the incoming radar signals and incapable of receiving signals outside of the range of signals, where the range can include various signal properties and/or characteristics such as a range of wavelengths or frequencies. Further, the antenna 912 can receive a wide band of incoming signals and the controller 940, or other circuitry, can filter and/or process the received signals to detect the incoming radar signal emitted by the UAV. Alternatively, the antenna 912 can be tunable to receive signals having certain properties and/or characteristics, or range thereof. The tuning of the antenna 912 can be performed by the controller 940, or other suitable circuitry within the active landing marker 900. Additionally, the receiver 910 can include multiple antennas 912 that are each capable of receiving signals having certain properties and/or characteristics, or ranges thereof. The ability of the receiver 910 to receive a wide range of signals can allow the active landing marker 900 to be compatible with a variety of UAV radar systems, which can employ radar systems emitting radar signals having different and varied properties and/or characteristics. Additionally, the ability to receive a range of signals can allow the receiver 910 to operate on multiple channels to avoid interference from other signal sources.

Much like the receiver 910, the transmitter 920 can include an antenna 922 that is constructed and/or structured to transmit the reply signal to the UAV. As with the antenna 912 of the receiver 910, the antenna 922 of the transmitter can transmit signals having particular properties and/or characteristics, or ranges thereof. Additionally, the antenna 922 can be tunable to allow transmission of reply signals having various properties and/or characteristics. While the receiver 910 and transmitter 920 are shown as separate components, they can be integrated as a transceiver in a further embodiment.

The active landing marker 900 includes a power source 930 to provide power for processing of the incoming radar signal, transmission of the reply signal, and/or other functions of the active landing marker 900. The power source 930 can include a battery 932, which can be permanent or replaceable, and/or rechargeable. In the case of a rechargeable battery 932, the active landing marker 900 can also include a recharging means, such as a port to connect the battery 932 to an external power source for charging or solar panels 934 disposed on the exterior of the active landing marker 900 and connected to the battery 932 for charging purposes. The active landing marker 900 can include circuitry allowing the active landing marker 900 to draw minimal or no power from the power source 930 until the receiver 910 receives a radar signal from the UAV. Upon receipt of the incoming radar signal, the receiver 910 can trigger the active landing marker 900 enter an active mode to process the incoming radar signal, transmit a reply, and/or perform additional functions in preparation for the delivery. Alternatively, the power source 930 can be an external power source that is connected to the active landing marker 900 as required.

The controller 940 can include a processor 942 and memory 944. The memory 944 can be non-volatile and store instructions which are executable by the processor 942 to perform various functions of the active landing marker 900. The controller 940 can process signals received by the receiver 910, including filtering the received signal and/or processing the received signal. Additionally, the controller 940 can cause the transmission of the reply signal via the transmitter 920 from the active landing marker 900. The controller 940 can generate the reply signal such that the signal includes properties and/or characteristics detectable by the UAV, in order to facilitate the transfer of information from the active landing marker 900 to the UAV.

The active landing marker 900 can also include the identification 950 of the active landing marker 900. The identification 950 can include a unique identification corresponding to the active landing marker 900, such as a serial number, and/or can include other identification of the active landing marker 900, such as a property and/or characteristic of the active landing marker 900. The identification 950 can be transmitted or relayed to the UAV with, or separate, from the reply signal transmitted from the active landing marker 900. The identification 950 can be permanent, such as a serial number, or can be changeable, such as a name, location, or other modifiable identifier of the active landing marker 900.

The active landing marker 900 can also include one or more sensors 960. The sensors can sense and/or detect an environment about the active landing marker 900, such as objects, people, animals and/or other detectable elements within the environment about the active landing marker 900. Example sensors 960 can include a motion sensor 962 and an object sensor 964, such as a radar. The sensors 960 can be activated to scan and/or sense the environment about the active landing marker 900 in response to incoming radar signals received by the receiver 910. Alternatively, the sensors 960 can be continuously active with the controller 940 monitoring signals from the sensors 960 to determine if additional action is required. For example, the active landing marker 900 can monitor the environment about the active landing marker 900 for potentially unsafe conditions, such as obstruction within delivery area and/or potential conflicts with people and/or animals. In response to detecting such a condition, the controller 940 can include in a reply signal an indication that the UAV should make the delivery in a specific location relative to the active landing marker 900, wait for the unsafe condition to clear, depart without depositing the delivery, and/or take other actions as deemed by the active landing marker 900 and/or as determined by the UAV based on the reply signal indicating the unsafe condition.

A location sensor, such as a Global Navigation Satellite System (GNSS) sensor 966 can be includes in the sensors 960 of the active landing marker 900. The GNSS sensor 966 can communicate with, and/or receive signals from, one or more satellite navigation systems to determine a location of the active landing marker 900. The one or more satellite navigation systems can include the Global Positioning System (GPS), the GLONASS system, the Galileo System, and other satellite navigation systems and/or services.

Additional sensors and/or sensor types can be included in the active landing marker 900, such as location sensors, light sensors, and/or other sensors. The additional, or other, sensors can be included depending on the operating conditions and/or environment in which the active landing marker 900 is to withstand and/or be placed within. Additionally, the sensors can be remote from and communicate with and/or be connected to active landing marker 900. For example, various sensors can be placed to define a landing zone for the UAV, the sensors can monitor for intrusions within the demarcated landing zone and transmit potential breaches to the active landing marker 900. Further, the sensors can be modular, allowing for specific sensors and/or sensor packages to be connected, or coupled, to the active landing marker 900 as necessary.

The active landing marker 900 can also include a communication component 970. The communication component can be integrated with and/or connected to the transmitter 920, or be separate therefrom. The communication component 970 can allow the active landing marker 900 to communicate with external devices and/or systems. For example, the communication component 970 can include a Wi-Fi communication component 972 and or a cellular network communication component 974, to allow the active landing marker 900 to communicate with an external system, such as a delivery location and/or the delivery provider. Communications can include messages regarding the status of a delivery, status of the environment about the active landing marker 900 and/or other relevant or necessary information. Additional communication components 970 to connect the active landing marker 900 to, or using, various networks and/or protocols can be included as necessary or desired.

A pulsing component 980, similar to the pulsing component 740 of FIG. 7, can be included in the active landing marker 900. The pulsing component 980 can selectively pulse or cycle, such as on and off, the modulated response transmitted by the transmitter 920. The pulsed nature of the modulated response can be used to transmit information to the UAV, with the pattern or other characteristic of the pulsed modulated response corresponding to one or more conditions or predetermined information items. Additionally, the pulsed nature of the modulated response can cause the UAV to perform one or more actions in response to receiving the pulsed modulated response.

Figure 10:
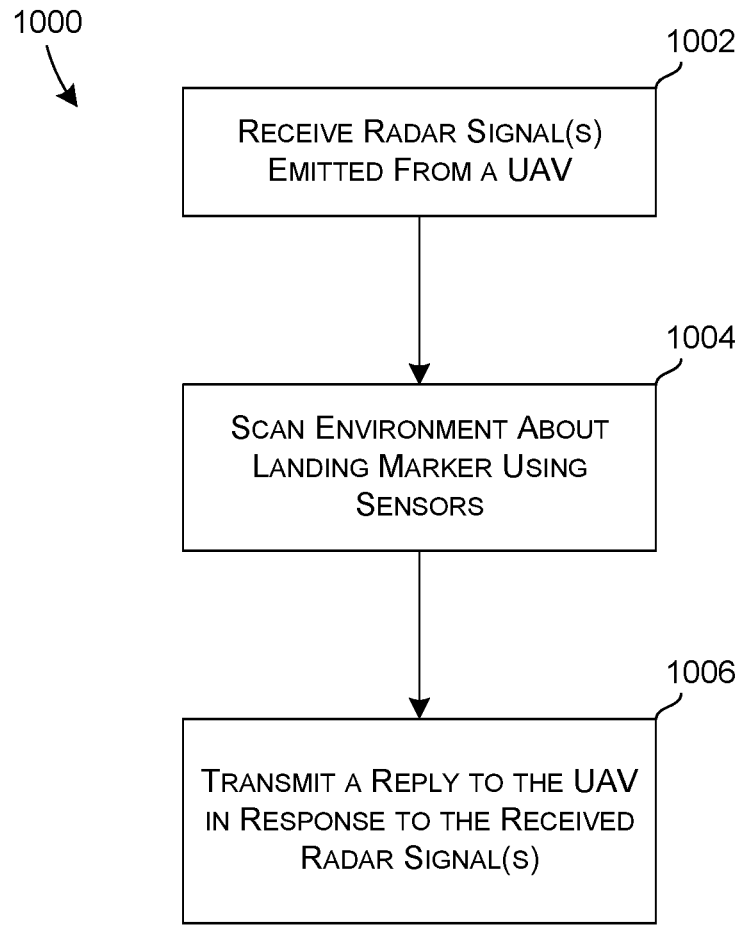
FIG. 10 is an example flow diagram illustrating an active landing marker responding to an approaching UAV.

FIG. 10 is an example flow diagram 1000 illustrating an active landing marker responding to an approaching UAV. At 1002, the active landing marker receives radar signals emitted by an approaching UAV. The received radar signals can be the radar signals used by the UAV, such as for navigation or collision avoidance, or can be other signals emitted by the UAV to detect the active landing marker. For example, the radar signal emitted by the UAV can have different properties and/or characteristics than the radar signals emitted by the UAV for other purposes.

At 1004, optionally, in response to the received radar signals, the active landing marker can scan or detect the environment about the landing marker to determine if there are obstructions within the landing area. Obstructions can include static items, such as a ball or other residential items, or dynamic items, such as a person or animal within the landing area. The active landing marker can determine a landing area status based on the detected environment about the active landing marker. The landing area status can include various levels, such as a closed landing area, an open landing area, and various statuses in-between. The active landing marker can transmit the status of the landing area as part of a reply signal and/or transmit instructions to the UAV based on the landing area status, such as a deliver or do not deliver instruction.

At 1006, the active landing marker transmits a reply signal to the UAV. The reply signal can be a simple reply signal as expected by the UAV, or can include additional information regarding the active landing marker, the landing area, and/or other information. The UAV can receive and process the reply signal to determine a location of the active landing marker, landing area, and/or other acts necessary to perform or abort the delivery, such as a waiting period or a return to a launch or other location associated with the UAV.

Figure 11:
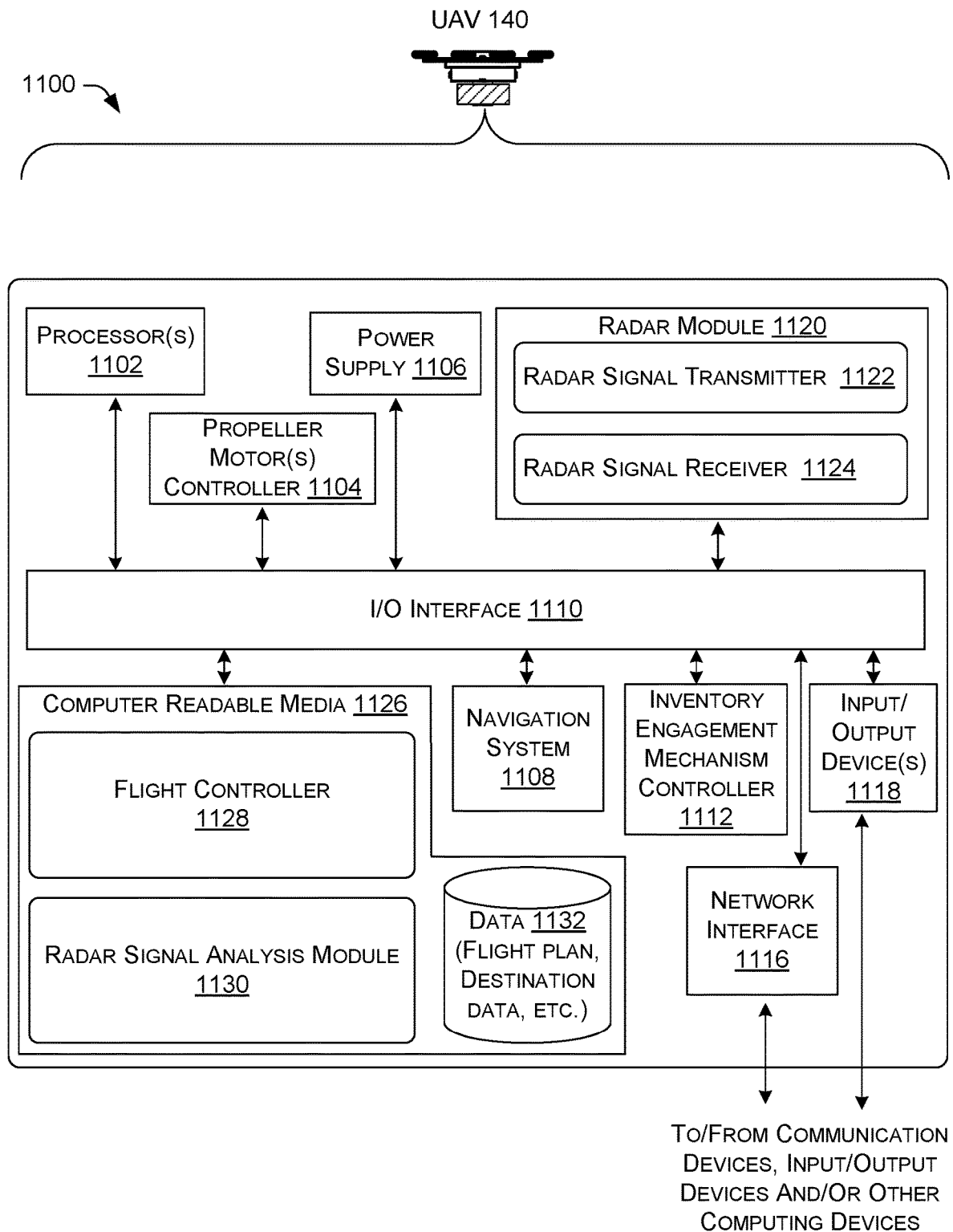
FIG. 11 is a block diagram of an example UAV architecture.

FIG. 11 is a block diagram of an example UAV architecture 1100 of the UAV 140. The UAV architecture 1100 may be used to implement the various systems, devices, and techniques discussed above. In the illustrated implementation, the UAV architecture 1100 includes one or more processors 1102, coupled to a non-transitory computer readable media 1122 via an input/output (I/O) interface 1110. The UAV architecture 1100 may also include a propeller motor controller 1104, power supply module 1106 and/or a navigation system 1108. The UAV architecture 1100 further includes an inventory engagement mechanism controller 1112 to interact with the item 142, a radar module 1120, a network interface 1116, and one or more input/output devices 1118.

In various implementations, the UAV architecture 1100 may be implemented using a uniprocessor system including one processor 1102, or a multiprocessor system including several processors 1102 (e.g., two, four, eight, or another suitable number). The processor(s) 1102 may be any suitable processor capable of executing instructions. For example, in various implementations, the processor(s) 1102 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1102 may commonly, but not necessarily, implement the same ISA.

The non-transitory computer readable media 1126 may be configured to store executable instructions/modules, data, flight paths, and/or data items accessible by the processor(s) 1102. In various implementations, the non-transitory computer readable media 1126 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 1126 or the UAV architecture 1100. Generally speaking, a non-transitory, computer readable memory may include storage media or memory media such as flash memory (e.g., solid state memory), magnetic or optical media (e.g., disk) coupled to the UAV architecture 1100 via the I/O interface 1110. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1116.

In one implementation, the I/O interface 1110 may be configured to coordinate I/O traffic between the processor(s) 1102, the non-transitory computer readable media 1126, and any peripheral devices, the network interface or other peripheral interfaces, such as input/output devices 1118. In some implementations, the I/O interface 1110 may perform any necessary protocol, timing or other data transformations to convert data signals from one component (e.g., non-transitory computer readable media 1126) into a format suitable for use by another component (e.g., processor(s) 1102). In some implementations, the I/O interface 1110 may include support for devices attached through various types of peripheral buses, such as a variant of the Peripheral Component Interconnect (PCI) bus standard or the Universal Serial Bus (USB) standard, for example. In some implementations, the function of the I/O interface 1110 may be split into two or more separate components, such as a north bridge and a south bridge, for example. Also, in some implementations, some or all of the functionality of the I/O interface 1110, such as an interface to the non-transitory computer readable media 1126, may be incorporated directly into the processor(s) 1102.

The propeller motor(s) controller 1104 communicates with the navigation system 1108 and adjusts the power of each propeller motor to guide the UAV along a determined flight path. The power supply module 1106 may control the charging and any switching functions associated with one or more power modules (e.g., batteries) of the UAV.

The navigation system 1108 may include a GNSS (Global Navigation Satellite System) or other similar system that can be used to navigate the UAV to and/or from a location. The inventory engagement mechanism controller 1112 communicates with the actuator(s) or motor(s) (e.g., a servo motor) used to engage and/or disengage inventory, such as the item 142. For example, when the UAV is positioned over a level surface at a delivery location, the inventory engagement mechanism controller 1112 may provide an instruction to a motor that controls the inventory engagement mechanism to release the item 142.

The radar module 1120 can include a radar signal transmitter 1122 and a radar signal receiver 1124. The radar signal transmitter 1122 can generate and transmit radar signals that are emitted from the UAV 140. The radar signals emitted from the UAV 140 can have a specific wavelength or range of wavelengths, and can be a subset of the electromagnetic spectrum, such as microwaves. The emitted radar signals can be broadcast in a wide pattern from the UAV 140 of can be broadcast in a narrow beam that can be scanned across an environment about the UAV 140. The radar signal receiver 1124 receives reflected radar signals from the environment about the UAV 140. The received reflected radar signals can be analyzed by a radar signal analysis module 1130 to generate a radar image of the surrounding environment about the UAV 140. Additionally, the radar signal receiver 1124 can receive a modulated response from a landing marker. In further embodiments, the radar signal transmitter 1122 and radar signal receiver 1124 can be integrated in a radar signal transceiver that can transmit and receive radar signals. Further, the UAV 140 can include multiple radar modules 1120 placed about the UAV 140 to emit radar signals and receive reflected radar signals from the surrounding environment and/or modulated responses from one or more landing markers.

The network interface 1116 may be configured to allow data to be exchanged between the UAV architecture 1100, other devices attached to a network, such as other computer systems, and/or with UAV control systems of other UAVs. For example, the network interface 1116 may enable wireless communication between numerous UAVs. In various implementations, the network interface 1116 may support communication via wireless general data networks, such as a Wi-Fi network. For example, the network interface 216 may support communication via telecommunications networks such as cellular communication networks, satellite networks, and the like.

The input/output devices 1118 may, in some implementations, include accelerometers and/or other input/output devices commonly used in aviation. Multiple input/output devices 1118 may be present and controlled by the UAV architecture 1100. One or more of these sensors may be utilized to assist in landings as well as avoiding obstacles during flight.

In some embodiments, the computer readable media 1126 may store the flight controller 1128, and the radar signal analysis module 1130. The components may access and/or write data 1132, which may include flight plan data, log data, destination data, image data, and object data, and so forth. The flight controller 1128 can control the travel or flight of the UAV 104 and may continually or from time to time provide controls to cause change in a velocity of the UAV, a change in heading, a change in altitude, a change in orientation, and/or other changes (e.g., pitch, roll, yaw, hover, etc.).

The radar signal analysis module 1130 can analyze radar signals, including reflected radar signals reflected off of the environment about the UAV 140 and the modulated response from one or more landing markers. The radar signal analysis module 1130 process the radar signals received by the radar signal receiver 1124 to generate a radar image of the environment about the UAV. A passive landing marker that absorbs incoming radar signal or disperses reflected radar signals, will appear as a hole or an area of reduced radar return in the radar image. The radar signal analysis module 1130 can determine the existence of such a hole in the radar image and determine if it is associated with a passive landing marker. Upon determining the existence of a passive landing marker within the environment about the UAV, the radar signal analysis module 1130 can determine a relative position of the passive landing marker and/or other characteristics or properties regarding the passive landing marker. An active landing marker will transmit a modulated response that can be received by the radar signal receiver 1124. The radar signal analysis module 1130 can analyze the received radar signals to determine the presence of a modulated response, such as a harmonic of the fundamental frequency of the radar signals emitted by the radar signal transmitter, to determine a relative position and/or other information regarding the active landing marker.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 1100 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 1100 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 1100. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 1100 may be transmitted to the UAV architecture 1100 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An unmanned aerial vehicle (UAV) landing marker, comprising:
    a structure including:
        a base;
        an upper side opposite the base, the upper side exposed to one or more radar signals emitted from the UAV, the upper side including a surface having one or more facets;
        one or more sides having a height that is less than a width of the upper side; and
        one or more materials;
    the structure to:
    intercept the one or more radar signals, and
    cause, based at least in part on the one or more materials and the one or more facets, and in response to the one or more radar signals, one or more of an absorption of at least a portion of the one or more radar signals or a dispersement of the one or more radar signals to create a radar void, the radar void being created by the UAV landing marker compared to an environment surrounding the UAV, the radar void providing UAV location information indicating a position of the UAV landing marker relative to the UAV.

2. The UAV landing marker of claim 1, wherein the one or more materials includes a radar absorbent material having a density or conductivity selected to cause absorption of the at least a portion of the one or more radar signals emitted from the UAV.

3. The UAV landing marker of claim 1, wherein the one or more materials are configured to cause absorption of the one or more radar signals having a predetermined range of frequencies.

4. The UAV landing marker of claim 1, further comprising a radar reflective component disposed on the upper side, the radar reflective component configured to reflect the one or more radar signals towards the UAV.

5. The UAV landing marker of claim 4, wherein the radar reflective component includes an identification of the UAV landing marker, the identification to perform at least one of:
    discriminate the UAV landing marker from one or more UAV landing markers,
    enhance detectability of the UAV landing marker, or
    provide a unique address of the UAV landing marker.

6. The UAV landing marker of claim 1, wherein the facets are configured to absorb at least a portion of the one or more radar signal emitted from the UAV.

7. The UAV landing marker of claim 1, wherein the structure includes the upper side and the one or more materials to cause, by the one or more materials and the one or more facets, the absorption of at least the portion of the one or more radar signals, and the absorption of at least the portion of the one or more radar signals is based at least in part on a size, a shape, or an angle of the one or more facets.

8. The UAV landing marker of claim 1, wherein the structure includes the upper side and the one or more materials to cause, by the one or more materials and the one or more facets, the dispersement of the one or more radar signals, and the dispersement of the one or more radar signals being based at least in part on a size, a shape, or an angle of the one or more facets.

9. An unmanned aerial vehicle (UAV) landing marker, comprising:
- a base; and
- a first side opposite the base, the first side including a surface having a profile, a material, and an electrical characteristic, the surface exposed to a first radar signal emitted from the UAV and having a signal characteristic, including at least one of a direction, an intensity, or a wavelength, the first radar signal contacting the surface and being dispersed by the surface as a second radar signal, the surface scattering at least a portion of the first radar signal based at least in part on the at least one of the profile, the material, or the electrical characteristic of the surface.

10. The UAV landing marker of claim 9, wherein the profile includes facets.

11. The UAV landing marker of claim 9, wherein the surface includes one or more pyramidal structures disposed thereon.

12. The UAV landing marker of claim 9, wherein the surface includes structures having one or more sides that extend outwardly from the surface and are oriented at an angle relative to the surface, the one or more sides extending to a common point located a distance outwardly from the surface, the distance relative to the angle at which the one or more sides are oriented relative to the surface.

13. The UAV landing marker of claim 12, wherein the angle and the distance from the surface of the structures is based at least in part on signal characteristics shared by the first radar signal.

14. The UAV landing marker of claim 9, wherein the material is configured to absorb at least a portion of the first radar signal.

15. The UAV landing marker of claim 14, wherein the material is selected based at least in part on a radar absorption characteristic and the signal characteristic of the first radar signal.

16. The UAV landing marker of claim 9, wherein a first strength of a first radar return of the landing marker is less than a second strength of a second radar return of an environment about the landing marker.

17. The UAV landing marker of claim 9, wherein an energy level of the first radar signal being dispersed by the surface as the second radar signal is reduced based at least in part on the first radar signal contacting the surface.

18. An unmanned aerial vehicle (UAV) landing marker, comprising:
- a housing having a plurality of sides that define a cavity; and
- a radar absorbent component stored within the cavity, the radar absorbent component configured to absorb a radar signal emitted from a UAV, the radar absorbent component having at least one of a material or a plurality of facets, the at least one of the material or the plurality of facets tuned to one or more characteristics of the radar signal.

19. The UAV landing marker of claim 18, wherein the radar absorbent component includes the plurality of facets has a size, a shape, or an angle, and the radar signal is minimized or dispersed by the plurality of facets based at least in part on the size, the shape, or the angle of the plurality of facets.

20. The UAV landing marker of claim 18, wherein the radar absorbent component includes the plurality of facets having a size, a shape, or an angle selected based at least in part on a frequency of the radar signal.

* * * * *